US010046718B2

United States Patent
Matsumoto et al.

(10) Patent No.: US 10,046,718 B2
(45) Date of Patent: Aug. 14, 2018

(54) TRANSPARENT SHIELD DEVICE, CAMERA DEVICE, AND TRANSPARENT STICKER

(71) Applicant: ASMO CO., LTD., Shizuoka-ken (JP)

(72) Inventors: Hiroshi Matsumoto, Hamamatsu (JP); Keigo Hikida, Toyohashi (JP)

(73) Assignee: Denso Corporation, Kariya (JP)

( * ) Notice: Subject to any disclaimer, the term of this patent is extended or adjusted under 35 U.S.C. 154(b) by 83 days.

(21) Appl. No.: 15/103,692

(22) PCT Filed: Nov. 19, 2014

(86) PCT No.: PCT/JP2014/080652
§ 371 (c)(1),
(2) Date: Jun. 10, 2016

(87) PCT Pub. No.: WO2015/104903
PCT Pub. Date: Jul. 16, 2015

(65) Prior Publication Data
US 2016/0311379 A1    Oct. 27, 2016

(30) Foreign Application Priority Data

Jan. 10, 2014  (JP) ................................. 2014-003532
Mar. 24, 2014  (JP) ................................. 2014-060454

(51) Int. Cl.
*H04N 5/225* (2006.01)
*B60R 11/04* (2006.01)
(Continued)

(52) U.S. Cl.
CPC ................ *B60R 11/04* (2013.01); *B05D 1/02* (2013.01); *B60J 1/02* (2013.01); *B60J 1/2094* (2013.01);
(Continued)

(58) Field of Classification Search
CPC .... B60R 11/04; B05D 1/02; B60J 1/02; B60J 1/2094; H04N 5/2252
(Continued)

(56) References Cited

U.S. PATENT DOCUMENTS

2008/0112050 A1    5/2008  Nomura

FOREIGN PATENT DOCUMENTS

JP    H10258706    9/1998
JP    H10311786    11/1998
(Continued)

OTHER PUBLICATIONS

JP2008-148276 Machine Translation.*
(Continued)

*Primary Examiner* — Nguyen Truong
(74) *Attorney, Agent, or Firm* — Patterson Thuente Pedersen, P.A.

(57) ABSTRACT

This transparent shield device has a windshield that is disposed in the sensing direction of an onboard camera. The windshield has an outer surface that is exposed to the outside. The outer surface has an extended imaging area, which includes the imaging area of the onboard camera, and a surrounding area. Furthermore, the transparent shield device has a water-repellent sticker that is positioned within the extended imaging area and/or a water-attracting coating layer that is positioned within the surrounding area. Liquid droplets deposited on the outer surface can be moved out of the imaging area or prevented from entering the imaging area from the surrounding area.

23 Claims, 8 Drawing Sheets

(51) Int. Cl.
  *B60J 1/02*    (2006.01)
  *B05D 1/02*    (2006.01)
  *B60J 1/20*    (2006.01)
  *B60R 11/00*   (2006.01)

(52) U.S. Cl.
  CPC .... *H04N 5/2252* (2013.01); *B60R 2011/0026* (2013.01)

(58) Field of Classification Search
  USPC .......................................................... 348/148
  See application file for complete search history.

(56) References Cited

FOREIGN PATENT DOCUMENTS

| | | |
|---|---|---|
| JP | 2001-10337 | 1/2001 |
| JP | 2002344786 | 11/2002 |
| JP | 2008-148276 | 6/2008 |
| JP | 2009157194 | 7/2009 |
| JP | 2009265473 | 11/2009 |
| JP | 2010-195235 | 9/2010 |
| JP | 2010-274717 | 12/2010 |
| JP | 2011-57528 | 3/2011 |
| JP | 2013-133264 | 7/2013 |
| JP | 2013154771 | 8/2013 |
| JP | 2014024354 | 2/2014 |
| JP | 2015-18106 | 1/2015 |

OTHER PUBLICATIONS

JP2010-247717 Machine Translation.*
Japanese Office Action dated Jul. 12, 2016 for Japanese Application No. 2015523722. English translation not available.
International Search Report (PCT/ISR/210) for International Application No. PCT/JP2014/080652 dated Feb. 10, 2015.

* cited by examiner

TRANSPARENT SHIELD DEVICE, CAMERA DEVICE, AND TRANSPARENT STICKER

RELATED APPLICATIONS

The present application in a National Phase entry of PCT Application No. PCT/JP2014/080652, filed Nov. 19, 2014, which claims priority to Japanese Patent Application No. 2014-003532, filed Jan. 10, 2014 and Japanese Patent Application No. 2014-060454 filed Mar. 24, 2014, all of said applications being hereby incorporated by reference in their entirety.

BACKGROUND OF THE INVENTION

The present invention relates to a transparent shield device, a camera device, and a transparent sticker.

The number of vehicles provided with an on-vehicle camera such as a drive recorder arranged at the inner side of a windshield (front windshield) has increased (refer to, for example, Patent Document 1).

Such a vehicle is capable of recording, for example, the situation outside the vehicle when an accident occurs.

PRIOR ART DOCUMENT

Patent Document

Patent Document 1: Japanese Laid-Open Patent Publication No. 2010-195235

SUMMARY OF THE INVENTION

However, when an on-vehicle optical sensor such as the above on-vehicle camera is arranged at the inner side of the windshield to sense the situation outside the windshield, due to the raindrops that move along the windshield during rain, the detection results (images when on-vehicle camera is used) that are obtained may not be satisfactory.

In particular, when the entire windshield has undergone a water-repellent treatment, many raindrops moving downwardly pass through a sensing zone when the vehicle is traveling at a low speed, and many raindrops moved upwardly by the wind produced when the vehicle is traveling at a high speed pass through the sensing zone. As a result, satisfactory detection results often cannot be obtained.

In the same manner, the field of view is obstructed by raindrops moved upwardly along the windshield of the vehicle when the vehicle is traveling at a high speed even when using the windshield wipers during rain (in particular, when the entire windshield has undergone a water-repellent treatment). The field of view is also obstructed by rain that falls from the vehicle roof when the brakes are applied. Thus, it is desired that the field of view be further ensured.

It is an object of the present invention to provide a transparent shield device, a camera device, and a transparent sticker that allow for satisfactory recognition of information outside a vehicle from the inner side of a windshield even in rain.

A transparent shield device that solves the above problem includes a transparent member arranged in a sensing direction of an optical sensor. The transparent member includes an outer surface exposed to an outer side. The outer surface includes an enlarged sensing zone including a sensing zone of the optical sensor and a surrounding zone located at a further outer side of the enlarged sensing zone. The transparent shield device further includes at least one of a water-repellent portion, which is water-repellent and located in the enlarged sensing zone, and a hydrophilic portion, which is hydrophilic and located in the surrounding zone. Movement of a water drop on the outer surface is allowed from the sensing zone to an outer side of the sensing zone or restricted from the surrounding zone into the sensing zone.

DETAILED DESCRIPTION OF THE PREFERRED EMBODIMENTS

A first embodiment of a transparent shield device will now be described with reference to FIGS. 1 and 2.

Figure 1:
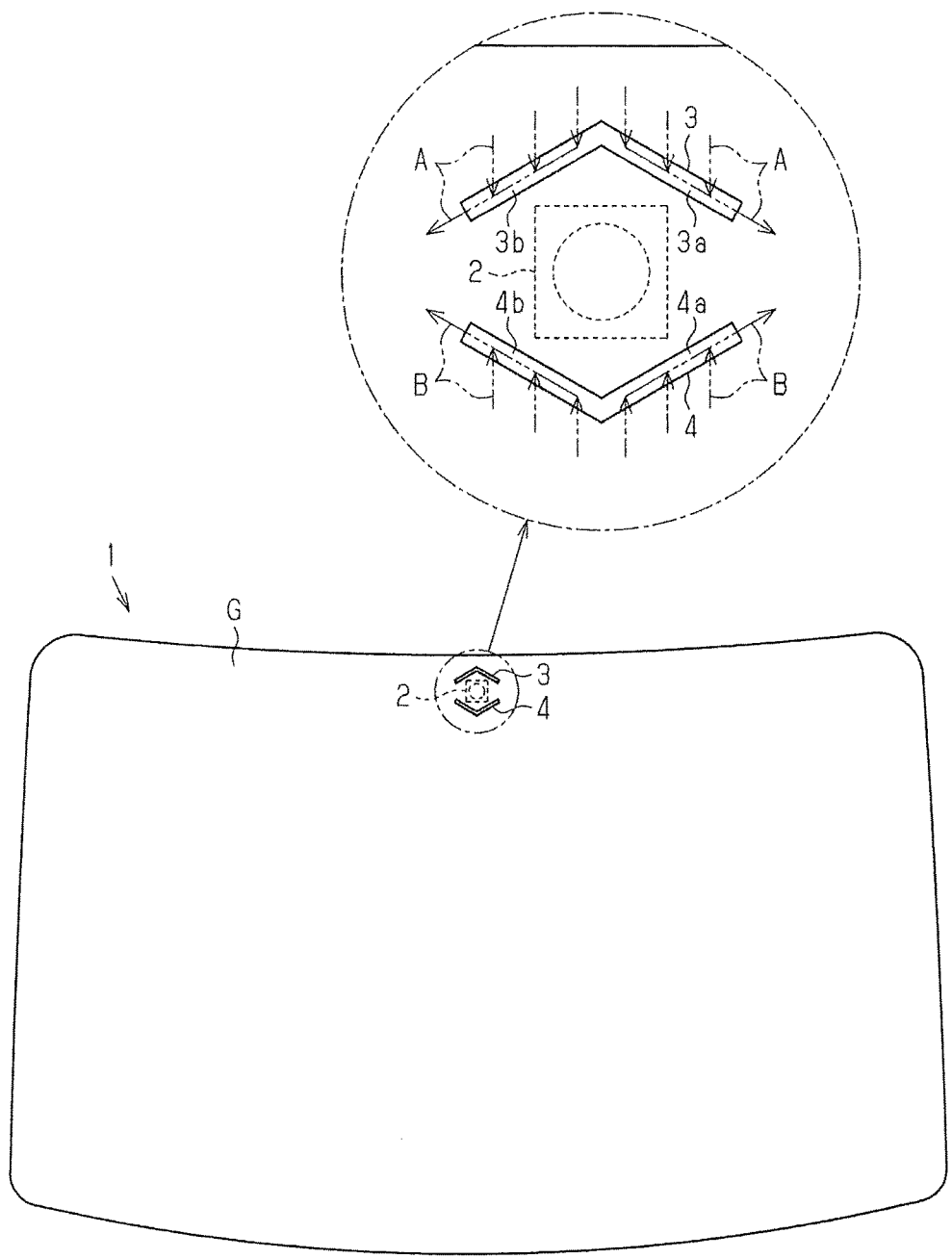
FIG. 1 is a front view showing a transparent shield device according to a first embodiment of the present invention.
Figure 2:
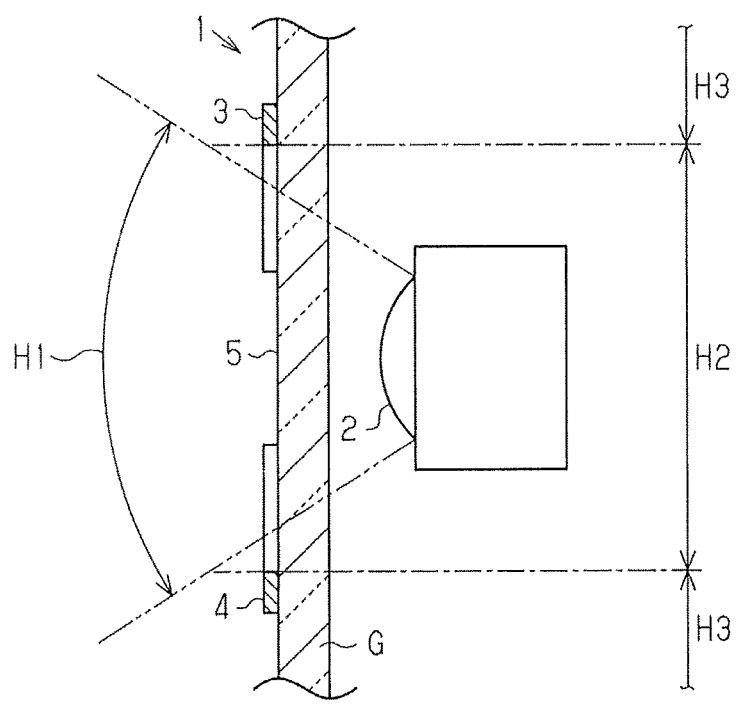
FIG. 2 is a partial cross-sectional view of the transparent shield device shown in FIG. 1.

As shown in FIGS. 1 and 2, an on-vehicle optical sensor-added vehicle 1 (hereinafter referred to simply as vehicle) includes a windshield G, which serves as a transparent member including an outer surface exposed to the outside.

Further, in the vehicle 1, an on-vehicle camera 2 (in this example, drive recorder), which serves as an on-vehicle optical sensor that captures images of and stores (records) vehicle exterior information (for example, situation), is arranged at the inner side of the windshield G. The on-vehicle camera 2 of the present embodiment is located at the upper laterally (horizontally) middle portion of the windshield G. The on-vehicle camera 2 is directed toward a portion of the windshield G that is not wiped by a vehicle windshield wiper. The on-vehicle camera 2 is located between a rearview mirror (not shown) and the windshield G. The on-vehicle camera 2 captures images of and records the situation outside the windshield G.

The outer surface of the windshield G is exposed to the outside. The outer surface includes an image capturing zone H1, which is a sensing zone of the on-vehicle camera 2, an enlarged image capturing zone H2, which is an enlarged sensing zone, and a surrounding zone H3, which is located at the outer side of the enlarged image capturing zone H2 (refer to FIG. 2). The enlarged image capturing zone H2 entirely includes the image capturing zone H1 on the outer surface of the windshield G and is slightly wider than the image capturing zone H1. The surrounding zone H3 surrounds the enlarged image capturing zone H2. In the first embodiment, the surrounding zone H3 is located at the upper and lower sides of the enlarged image capturing zone H2. Stickers 3 and 4, which serve as hydrophilic portions having hydrophilicity, are applied to the surrounding zone H3. The stickers 3 and 4 are colorless and transparent. The outer surfaces of the stickers 3 and 4 have a higher hydrophilicity than the outer surface of the windshield G where the stickers 3 and 4 are not applied. In the present embodiment, a water-repellent treatment is performed on the entire windshield G in advance by applying a water-repellent coating layer 5 to the entire windshield G. The stickers 3 and 4 are applied to the coating layer 5. That is, in the present embodiment, portions of the outer surface of the windshield G, excluding where the stickers 3 and 4 are applied, function as water-repellent portions that repel water.

The sticker 3 is located at the upper side of the image capturing zone H1. The sticker 3 includes a lateral (horizontal) middle portion, two lateral ends, and downwardly inclined portions 3a and 3b. The downwardly inclined portions 3a and 3b are respectively inclined downwardly from the middle portion toward the two ends. More specifically, the sticker 3 of the present embodiment includes the downwardly inclined portion 3a, which is inclined downwardly from the middle portion toward a first end, and the downwardly inclined portion 3b, which is inclined downwardly from the middle portion toward a second end.

The sticker 4 is located at the lower side of the image capturing zone H1. The sticker 4 includes a lateral (horizontal) middle portion, two lateral ends, and upwardly inclined portions 4a and 4b. The upwardly inclined portions 4a and 4b are respectively inclined upwardly from the middle portion toward the two ends. More specifically, the sticker 4 of the present embodiment includes the upwardly inclined portion 4a, which is inclined upwardly from the middle portion toward a first lateral end, and the upwardly inclined portion 4b, which is inclined upwardly from the laterally middle portion toward a second lateral end.

The operation of the transparent shield device will now be described. For example, when the vehicle is traveling at a low speed in rain, raindrops fall from the upper side of the upper sticker 3 into the image capturing zone H1 (front of on-vehicle camera 2). When reaching the sticker 3, the raindrops are guided to the laterally outer side mainly by the downwardly inclined portions 3a and 3b because of the hydrophilicity of the surface of the sticker 3. As a result, the raindrops flow out of the image capturing zone H1 (refer to arrow A shown by broken line in FIG. 1).

Further, when the vehicle is traveling at a high speed in rain, raindrops are blown upwardly by wind and enter the image capturing zone H1 (front of on-vehicle camera 2) from the lower side of the lower sticker 4. When reaching the sticker 4, the raindrops are guided to the laterally outer side mainly by the upwardly inclined portions 4a and 4b because of the hydrophilicity of the surface of the sticker 4. As a result, the raindrops flow out of the image capturing zone H1 (refer to arrow B shown by broken line in FIG. 1).

The above embodiment has the advantages described below.

(1) The windshield G includes the outer surface that is exposed to the outside. The outer surface includes the enlarged image capturing zone H2, which includes the image capturing zone H1 of the on-vehicle camera 2, and the surrounding zone H3, which is located further outwardly from the enlarged image capturing zone H2. The water-repellent coating layer 5 is located in the enlarged image capturing zone H2, and the hydrophilic stickers 3 and 4 are located in the surrounding zone. The water-repellent coating layer 5 allows raindrops on the outer surface of the windshield G to move out of the image capturing zone H1. Further, the hydrophilic stickers 3 and 4 limit the entrance of raindrops on the outer surface of the windshield G into the image capturing zone H1 from the surrounding zones H3.

More specifically, for example, the upper sticker 3 located outside the image capturing zone H1 reduces raindrops that fall from above the sticker 3 and enter the image capturing zone H1. Further, for example, the lower sticker 4 located outside the image capturing zone H1 reduces raindrops blown upwardly by wind from below the sticker 3 and enter the image capturing zone H1. Thus, the passage of raindrops through the image capturing zone H1 of the on-vehicle camera 2 is limited even when it is raining. This allows the on-vehicle camera 2 to detect (capture images of) vehicle exterior information in a satisfactory manner.

(2) The upper sticker 3 located outside the image capturing zone H1 includes the downwardly inclined portions 3a and 3b, which are inclined downwardly from the middle portion toward the two ends. This allows raindrops that fall from above and reach the sticker 3 to be guided to the laterally outer side by the downwardly inclined portions 3a and 3b. Thus, raindrops smoothly flow out of the image capturing zone H1.

(3) The upper sticker 4 located outside the image capturing zone H1 includes the upwardly inclined portions 4a and 4b, which are inclined upwardly from the middle portion toward the two ends. This allows raindrops that are blown upwardly by wind from below and reach the sticker 4 to be guided to the laterally outer side by the upwardly inclined portions 4a and 4b. Thus, raindrops smoothly flow out of the image capturing zone H1.

(4) Since the stickers 3 and 4 having the hydrophilic outer surfaces are used as hydrophilic portions, the hydrophilic portions may easily be arranged on (need only be applied to) the windshield G.

The first embodiment may be modified as follows.

In the first embodiment, the transparent shield device includes the stickers 3 and 4, which serve as hydrophilic portions, and a water-repellent treatment is performed on the entire windshield G. Instead, the transparent shield may have a different shape.

Figure 3:
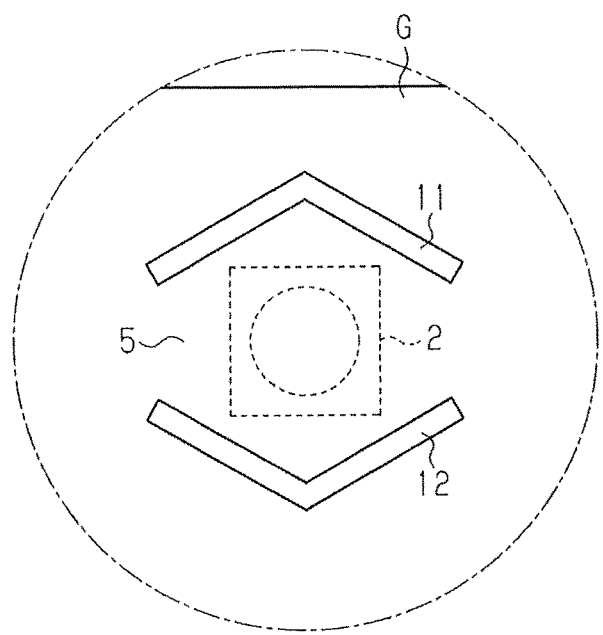
FIG. 3 is a partially enlarged front view showing a transparent shield device of another example.

For example, the hydrophilic portions may be changed as shown in FIG. 3. The hydrophilic portions of this example are hydrophilic coating layers 11 and 12. The windshield G is coated by a coating agent to form the coating layers 11 and 12. In such a case, the upper coating layer 11 reduces raindrops that fall from above and enter the image capturing zone H1 (front of on-vehicle camera 2). Further, the lower coating layer 12 reduces raindrops blown upwardly by wind from below and enter the image capturing zone H1 (front of on-vehicle camera 2). In addition, since the coating layers 11 and 12 are hydrophilic, the hydrophilic portions are easily arranged just by applying or spraying a coating agent.

Figure 4:
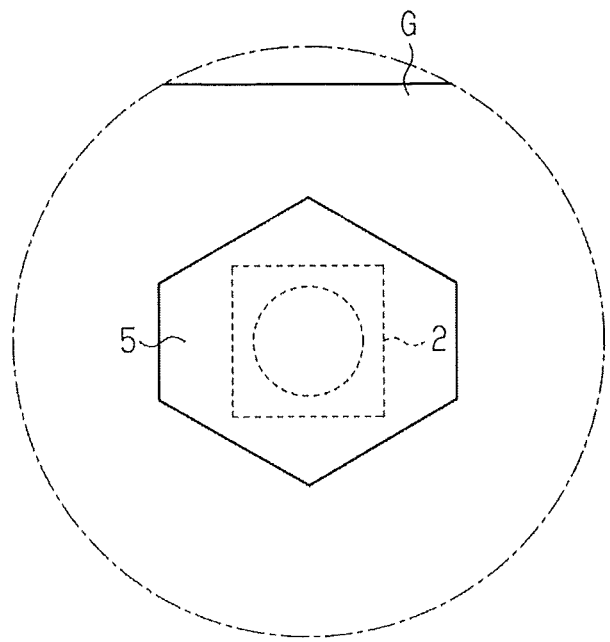
FIG. 4 is a partially enlarged front view showing a transparent shield device of a further example.

For example, as shown in FIG. 4, the hydrophilic portion may be omitted leaving only the water-repellent portion. The water-repellent portion of this example is arranged only in the enlarged image capturing zone H2 and not on the entire outer surface of the windshield G. In the same manner as the first embodiment, the water-repellent portion is the water-repellent coating layer 5.

Figure 5:
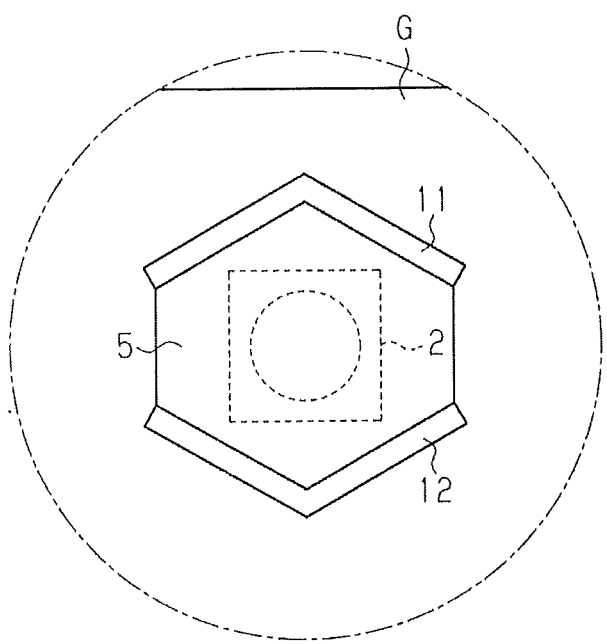
FIG. 5 is a partially enlarged front view showing a transparent shield device of a further example.

For example, as shown in FIG. 5, the transparent shield device may include the hydrophilic coating layers 11 and 12 of FIG. 3 and the water-repellent coating layer 5 of FIG. 4.

Figure 6:
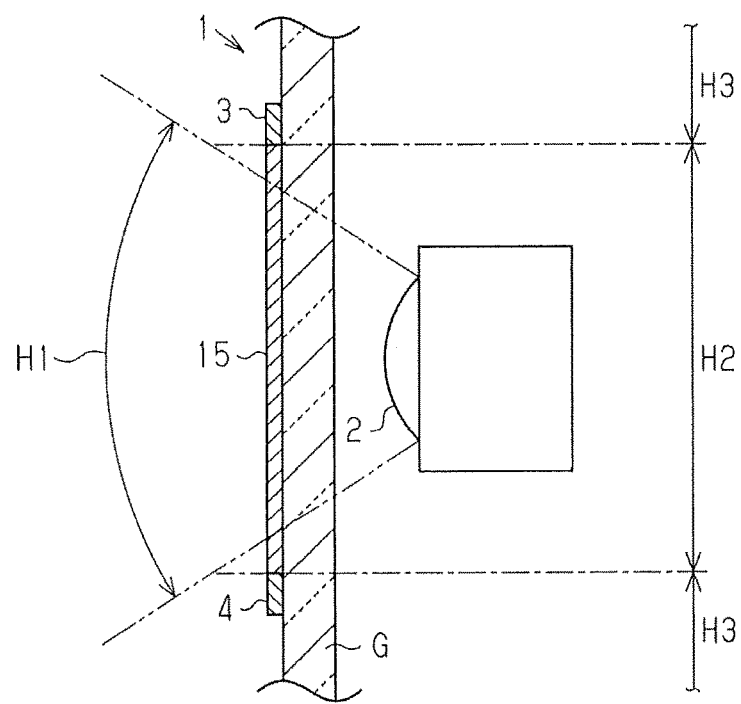
FIG. 6 is a partial cross-sectional view showing a transparent shield device of a further example.

For example, as shown in FIG. 6, the water-repellent portion may be a water-repellent sticker 15. The sticker 15 is colorless and transparent. The outer surface of the sticker 15 has a higher water-repellency than the outer surface of the windshield G where the sticker 15 is not applied. In FIG. 6, the stickers 3 and 4 serve as hydrophilic portions. Instead, the hydrophilic portions may be the coating layers 11 and 12 shown in FIG. 3.

Figure 7:
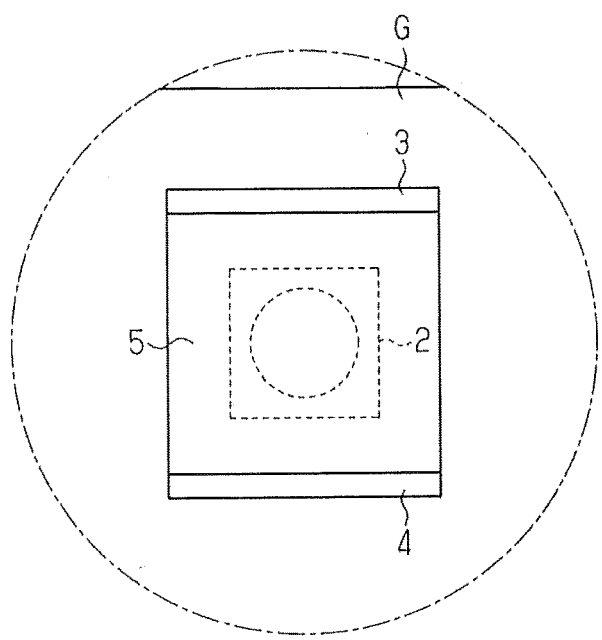
FIG. 7 is a partially enlarged front view showing a transparent shield device of a further example.

In the above embodiment, the stickers 3 and 4, which serve as hydrophilic portions, include the downwardly inclined portions 3a and 3b and the upwardly inclined portions 4a and 4b. However, the hydrophilic portions are not limited to such shape and may be changed in shape. For example, as shown in FIG. 7, the hydrophilic portions may respectively extend straight in the lateral direction (horizontal direction) of the vehicle. The stickers 3 and 4 serve as the hydrophilic portions in FIG. 7. However, the hydrophilic portions may be the coating layers 11 and 12. The coating layer 5 serves as the water-repellent portion in FIG. 7. However, the water-repellent portion may be the sticker 15.

The hydrophilic portions (stickers 3 and 4) of the first embodiment may be changed in shape so that the upper hydrophilic portion and the lower hydrophilic portion, which are located outside the image capturing zone H1, are connected to each other at the laterally outer side of the image capturing zone H1. For example, a circular hydrophilic portion may surround the image capturing zone H1. In this example, the surrounding zone H3 includes a first side (right) and a second side (left) of the image capturing zone H1 in addition to the upper side and the lower side of the image capturing zone H1.

In the first embodiment, the stickers 3 and 4, which are hydrophilic and serve as hydrophilic portions, are located at an upper position and a lower position outside of the image capturing zone H1. Instead, the first embodiment may include only one of the hydrophilic portions.

In the first embodiment, the present invention is applied to a structure in which the on-vehicle camera 2 is located at the inner side of the windshield G. However, the present invention is not limited to this structure. For example, in a vehicle that includes the on-vehicle camera at the inner side of a rear window, the rear window may include at least one of the hydrophilic portion or the water-repellent portion. In such a case, it is less likely that raindrops are upwardly moved from below by wind even when the vehicle is traveling at a high speed. Thus, a sufficient effect is obtained even when the hydrophilic portion is located only at the upper outer side of the image capturing zone. Alternatively, a sufficient effect may be obtained even when just arranging the water-repellent portion in the image capturing zone.

In the first embodiment, the present invention is applied to a structure in which the on-vehicle optical sensor is the on-vehicle camera 2. However, the present invention is not limited to this structure. For example, the hydrophilic portions may be arranged on the windshield G in a vehicle in which the inner side of the windshield G includes a radar that measures the distance to a front vehicle, which is vehicle exterior information, or an on-vehicle optical sensor using laser light, of which the sensing results are adversely affected by water drops.

In the first embodiment and the modified examples, the present invention is applied to examples that include an on-vehicle optical sensor. However, the present invention is not limited to such examples. A hydrophilic portion having hydrophilicity may be arranged in at least one of the upper side and the lower side of the outer surface of the windshield G to obtain a field of view for the vehicle occupants including the driver.

Figure 8:
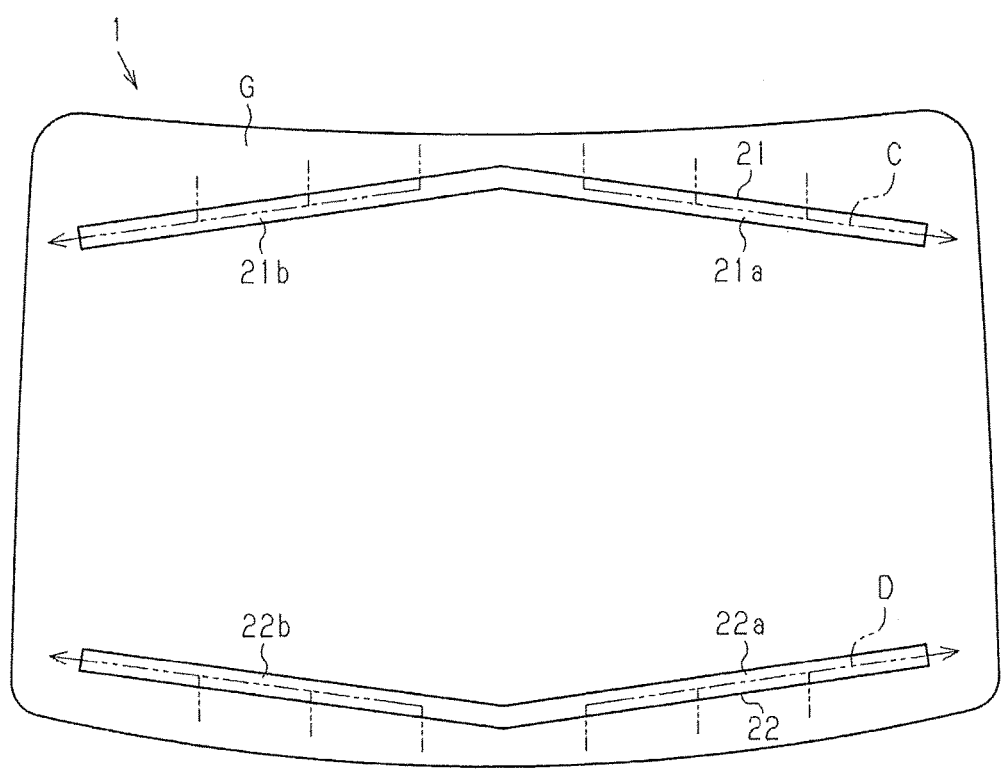
FIG. 8 is a front view showing a transparent shield device of a further example.

For example, as shown in FIG. 8, the stickers 21 and 22, which are hydrophilic and serve as hydrophilic portions, may be applied to the upper side and the lower side of the outer surface of the windshield G.

In this example, the upper sticker 21 includes a laterally (horizontally) middle portion, two lateral ends, and downwardly inclined portions 21a and 21b. The downwardly inclined portion 21a is inclined downwardly from the middle portion toward a first end. The downwardly inclined portion 21b is inclined downwardly from the middle portion toward a second end. Further, the lower sticker 22 includes a laterally (horizontally) middle portion, two lateral ends, and upwardly inclined portions 22a and 22b. The upwardly inclined portion 22a is inclined upwardly from the middle portion toward the first end. The upwardly inclined portion 22b is inclined upwardly from the middle portion toward the second end.

In such a structure, for example, when the vehicle is traveling at a low speed or when the brakes are applied, raindrops fall from the upper side of the upper sticker 21 and move toward the middle of the windshield G (field of view). When reaching the sticker 21, the raindrops are guided and outwardly moved to the laterally outer side mainly by the downwardly inclined portions 21a and 21b because of the hydrophilicity of the surface of the sticker 21 (refer to arrow C shown by broken line in FIG. 8).

Further, for example, when the vehicle is traveling at a high speed during rain, raindrops are moved by wind from the lower side of the lower sticker 22 toward the middle of the windshield G (field of view). When reaching the sticker 22, the raindrops are guided and outwardly moved to the laterally outer side mainly by the upwardly inclined portions 22a and 22b because of the hydrophilicity of the surface of the sticker 22 (refer to arrow D shown by broken line in FIG. 8). This reduces the raindrops that pass through the field of view of vehicle occupants, which include the driver, even during rain and allows the vehicle occupants to view the outside in a satisfactory manner.

Further, in this example, the stickers 21 and 22 are arranged on the entire outer surface of the windshield G in the lateral direction. Instead, a sticker that serves as a hydrophilic portion having hydrophilicity may be arranged in at least one of the upper side and the lower side of the field of view (eye point) located in front of a driver seat.

In such an example directed to the field of view of vehicle occupants, the hydrophilic portions may be formed by coating layers or changed in shape as described above.

The hydrophilic portion and the water-repellent portion may be arranged in a location of the windshield G that is wiped by a vehicle windshield wiper.

Figure 9:
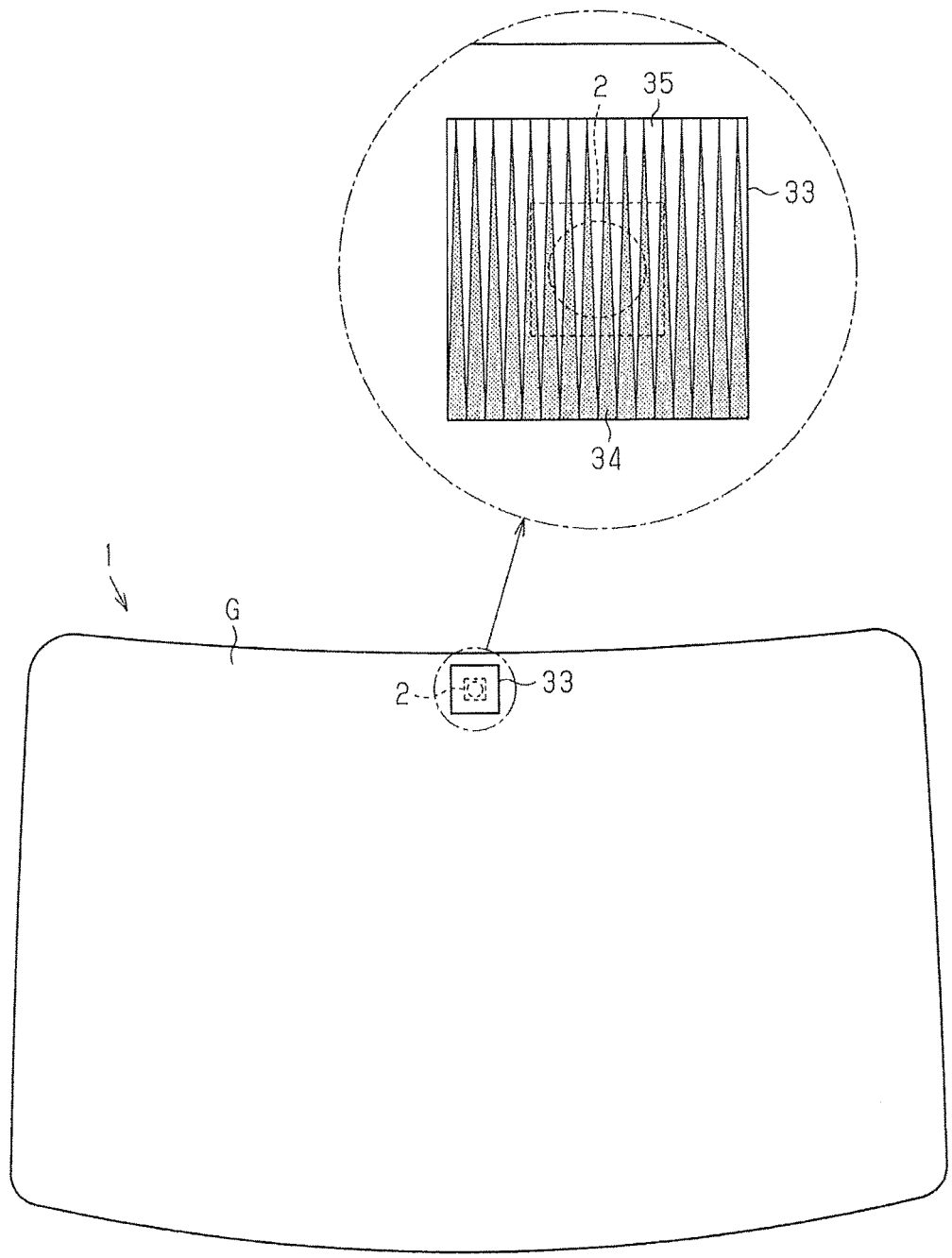
FIG. 9 is a front view showing a transparent shield device according to a second embodiment of the present invention.
Figure 10:
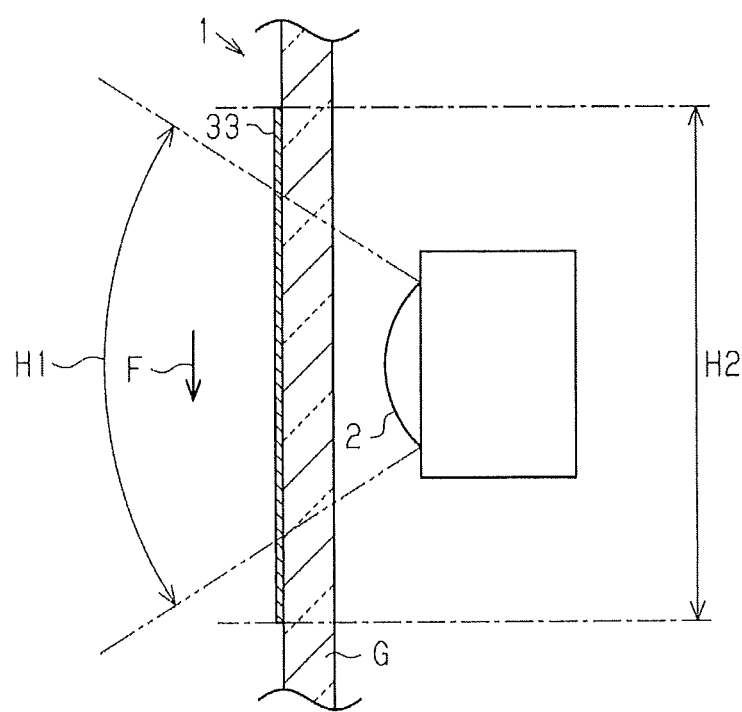
FIG. 10 is a partial cross-sectional view of the transparent shield device shown in FIG. 9.
Figure 11:
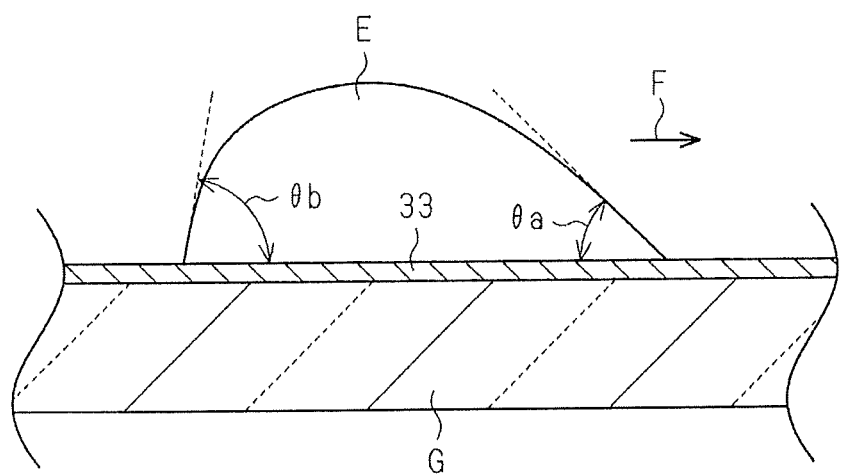
FIG. 11 is a schematic cross-sectional view of the conveying force of a raindrop applied by a hydrophilic portion and a water-repellent portion shown in FIG. 9.

A second embodiment of a transparent shield device will now be described with reference to FIGS. 9 to 11. Like or same reference numerals are given to those components that are the same as the corresponding components of the first embodiment and thus will not be described.

A sticker 33 is applied to a location of the outer surface of the windshield G that corresponds to the image capturing zone H1 (refer to FIG. 10), which is a sensing zone of the on-vehicle camera 2. More specifically, the sticker 33 is applied to the enlarged image capturing zone H2. The outer surface of the sticker 33 includes a hydrophilic portion 34 (second hydrophilic portion) and a water-repellent portion 35, which extend over a larger zone than the image capturing zone H1. The hydrophilic portion 34 has a higher hydrophilicity than the water-repellent portion 35. The water-repellent portion 35 has a higher water-repellency than the hydrophilic portion 34. In the sticker 33, the area of the hydrophilic portion 34 gradually increases in a gravitational direction. In the sticker 33, the area of the water-repellent portion 35 gradually decreases in the gravitational direction. In the present embodiment, the sticker 33 is tetragonal. The hydrophilic portion 34 extends straight in the gravitational direction as viewed from the front of the vehicle 1 along the outer surface of the windshield G as the width of the hydrophilic portion 34 gradually increases. The water-repellent portion 35, which is a portion that excludes the hydrophilic portion 34, extends straight in the gravitational direction as viewed from the front of the vehicle 1 along the outer surface of the windshield G as the width of the water-repellent portion 35 gradually decreases. In the present embodiment, the hydrophilic portion 34 and the water-repellent portion 35 of the sticker 33 are arranged in a predetermined pattern. The hydrophilic portion 34 and the water-repellent portion 35 of the sticker 33 are colorless and transparent. However, the hydrophilic portion 34 is shaded to facilitate visual understanding in the partially enlarged view of FIG. 9. Further, the sticker 33 is arranged prior to application to the windshield G so that the area of the hydrophilic portion 34 gradually increases in a certain direction and the area of the water-repellent portion 35 gradually decreases in the certain direction. The sticker 33 is applied to the windshield G so that the certain direction corresponds to the gravitational direction. It is preferred that water drops that are subject to removal come into contact with both the hydrophilic portion 34 and the water-repellent portion 35 to produce a conveying force acting on the water drops. Thus, it is preferred that the width of the hydrophilic portion 34 and the width of the water-repellent portion 35 be smaller than the diameter of the water drops (size of surface sticker 33 that contacts water drops).

The operation of the above transparent shield device will now be described.

For example, when raindrops are collected on the outer surface of the sticker 33 of the windshield G during rain, the action of the sticker 33 (conveying force F of water drops applied by hydrophilic portion 34 and water-repellent portion 35) and the gravitational force are applied so that the raindrops mainly flow in the gravitational direction. More specifically, as shown in FIG. 11, the sticker 33 (hydrophilic portion 34 and water-repellent portion 35) produces the conveying force F applied to a water drop E. That is, when the windshield G and the sticker 33 are horizontally arranged, a water drop E on the sticker 33 extends across the region where the hydrophilic portion 34 has a large area (lower side in FIG. 9) and the region where the water-repellent portion 35 has a large area (upper side in FIG. 9). In such a case, as shown in FIG. 11, a portion of the water drop E located in the region where the hydrophilic portion 34 has a large area has a contact angle θa relative to the sticker 33, and a portion of the water drop E located in the region where the water-repellent portion 35 has a large area has a contact angle θb relative to the sticker 33. Since the contact angle θa is smaller than the contact angle θb, the conveying force F acts on the water drop E toward the region where the hydrophilic portion 34 has a large area (right in FIG. 11). In the present embodiment, the conveying force F acts in a direction that corresponds to the direction in which the gravitational force acts. Thus, raindrops mainly move in the gravitational direction. Although the windshield G is vertically shown in FIG. 10, the windshield G may be inclined. In such a case, a component force of the gravitational force and the conveying force F are applied so that raindrops move in the gravitational direction (more specifically, direction of component force of gravitational force on the surface on which windshield G is inclined).

The second embodiment has the advantages described below.

(5) The hydrophilic portion 34 (second hydrophilic portion) is hydrophilic and located in the enlarged image capturing zone H2. The water-repellent portion 35 of the enlarged image capturing zone H2 has an area that gradually decreases in the gravitational direction. The hydrophilic portion 34 and the water-repellent portion 35 are arranged adjacent to each other. The hydrophilic portion 34 has an area that gradually increases in the gravitational direction. Thus, even when raindrops are collected on the outer surface of the sticker 33, the raindrops easily flow in the gravitational direction because of the conveying force F, which is produced by the hydrophilic portion 34 and the water-repellent portion 35, and the gravitational force. This limits situations in which raindrops remain on the outer surface of the windshield G in the sensing direction of the on-vehicle camera 2. This allows the on-vehicle camera 2 to perform satisfactory detection, that is, image capturing.

(6) The hydrophilic portion 34 and the water-repellent portion 35 (that is, sticker 33) are arranged over a zone in the outer surface of the windshield G that is larger than the image capturing zone H1 of the on-vehicle camera 2. This moves raindrops out of the image capturing zone H1 of the on-vehicle camera 2. Accordingly, the on-vehicle camera 2 is capable of performing satisfactory image capturing.

(7) The hydrophilic portion 34 and the water-repellent portion 35 are arranged in a single sticker 33. The sticker 33 is applied to the outer surface of the windshield G. This allows the hydrophilic portion 34 and the water-repellent portion 35 to be easily arranged on the windshield G. In particular, this is preferable when the hydrophilic portion 34 and the water-repellent portion 35 are both set in a predetermined pattern to form a single sticker 33.

The second embodiment may be modified as follows.

The hydrophilic portion 34 and the water-repellent portion 35 of the second embodiment may be changed to shapes having other patterns as long as the conveying force F acts in the gravitational direction rather than the horizontal direction.

Figure 12:
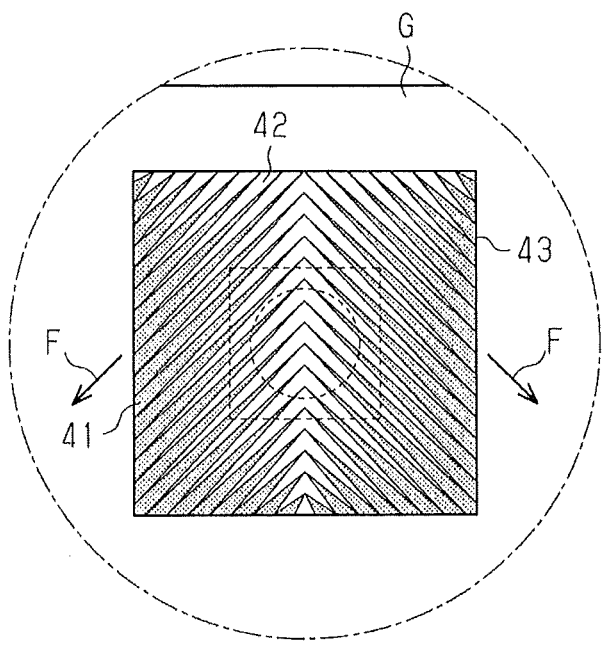
FIG. 12 is a partially enlarged front view showing a vehicle windshield of a further example.
Figure 13:
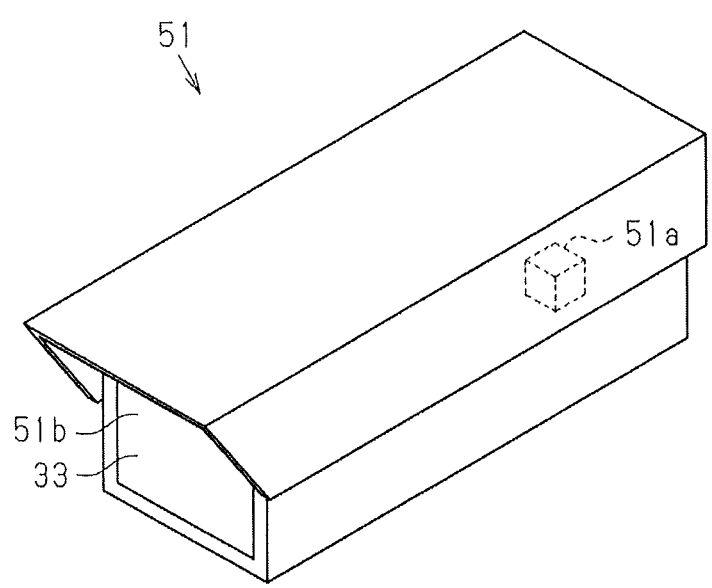
FIG. 13 is a perspective view showing a camera device.

For example, the sticker 33 may be changed to a sticker 43 shown in FIG. 12. A hydrophilic portion 41 (second hydrophilic portion) of this example extends obliquely toward the laterally outer side in the gravitational direction as viewed from the front of the vehicle 1 along the outer surface of the windshield G. The width of the hydrophilic portion 41 gradually increases toward the laterally outer side. A water-repellent portion 42, which is a portion of the sticker 43 that excludes the hydrophilic portion 41, extends obliquely toward the laterally outer side in the gravitational direction as viewed from the front of the vehicle 1. The width of the water-repellent portion 42 gradually decreases toward the laterally outer side. In such a structure, when raindrops are collected on the outer surface, the hydrophilic portion 41 and the water-repellent portion 42 produce a conveying force that acts on raindrops obliquely toward the laterally outer side in the gravitational direction as viewed from the front of the vehicle 1. As a result, the raindrops are easily moved in the gravitational direction by the conveying force F, which is produced by the hydrophilic portion 41 and the water-repellent portion 42, and the gravitational force. In this example, the hydrophilic portion 41 and the water-repellent portion 42 of the sticker 43 are colorless and transparent. However, in FIG. 12, the hydrophilic portion 41 is shaded to facilitate visual understanding.

In the above embodiment, the hydrophilic portion 34 (41) and the water-repellent portion 35 (42) are arranged in the single sticker 33 (43) and applied to the outer surface of the windshield G. However, the hydrophilic portion 34 (41) and the water-repellent portion 35 (42) are not limited to such a structure. For example, the hydrophilic portion may be a hydrophilic coating layer, and the water-repellent portion may be a water-repellent coating layer. A coating agent may be directly coated on the windshield G to form the hydrophilic coating layer and the water-repellent coating layer. The hydrophilic coating layer and the water-repellent coating layer may be easily arranged just by applying or spraying a coating agent.

The hydrophilic portion only needs to have a higher hydrophilicity than the water-repellent portion. For example, just a hydrophilic portion having a high hydrophilicity may be applied to the original outer surface of the windshield G by a coating agent. In such a case, the original outer surface of the windshield G functions as the water-repellent portion. In contrast, the water-repellent portion only needs to have a higher water-repellency than the hydrophilic portion. For example, just a water-repellent portion having a high water-repellency may be applied to the original outer surface of the windshield G by a coating agent. In such a case, the original outer surface of the windshield G functions as the hydrophilic portion.

In the above embodiment, the hydrophilic portion 34 and the water-repellent portion 35 (that is, sticker 33) are located in the enlarged image capturing zone H2 on the outer surface of the windshield G. Instead, for example, the hydrophilic portion 34 and the water-repellent portion 35 may be located only around the central portion in the image capturing zone H1 of the on-vehicle camera 2.

In the above embodiment, the present invention is applied to the structure including the on-vehicle camera 2, which serves as an optical sensor, and the windshield G, which serves as a transparent member. However, the present invention is not limited to this structure. The optical sensor and the transparent member may be replaced with other members.

The present invention may be applied to, for example, a camera device 51 (surveillance camera) that is arranged along a road or river. The camera device 51 includes a camera sensor 51a, which serves as an optical sensor and capture images of the outside, a glass window 51b, which serves as a transparent member and is exposed to the outside, and the sticker 33 (hydrophilic portion 34 and water-repellent portion 35) arranged on the glass window 51b. Such a structure limits situations in which water drops such as raindrops remain on the outer surface of the glass window 51b and allows for satisfactory image capturing.

Further, the on-vehicle optical sensor may use radar or laser light that measures the distance to a front vehicle. The hydrophilic portion and the water-repellent portion may be arranged in a sensing direction of the radar or laser light and arranged at the transparent member exposed to the outside as described above.

In addition, the on-vehicle camera 2 may be used as a side mirror camera that captures an image of the side of a vehicle or a rear camera that captures an image at the rear of a vehicle.

DESCRIPTION OF REFERENCE CHARACTERS

1: vehicle
2: on-vehicle camera (optical sensor)
3, 4, 21, 22: sticker (hydrophilic portion)
3a, 3b, 4a, 4b, 21a, 21b, 22a, 22b: inclined portion
5: coating layer (water-repellent portion)
15: sticker (water-repellent portion)
11, 12: coating layer (hydrophilic portion)
33, 43: sticker
34, 41: hydrophilic portion
35, 42: water-repellent portion
51: camera device
51a: camera sensor
51b: glass window (transparent member)
E: water drop
F: conveying force
G: windshield (transparent member)
θa, θb: contact angle
H1: image capturing zone (sensing zone)
H2: enlarged image capturing zone (enlarged sensing zone)
H3: surrounding zone

The invention claimed is:

1. A transparent shield device comprising:
a transparent member arranged in a sensing direction of an optical sensor, wherein the transparent member includes an outer surface exposed to an outer side, and the outer surface includes an enlarged sensing zone including a sensing zone of the optical sensor and a surrounding zone located at a further outer side of the enlarged sensing zone; and
at least one of a water-repellent portion, which is water-repellent and located in the enlarged sensing zone, and an upper hydrophilic portion, which is hydrophilic and located in the surrounding zone, wherein movement of a water drop on the outer surface is allowed from the sensing zone of the optical sensor to an outer side of the sensing zone of the optical sensor or restricted from the surrounding zone into the sensing zone of the optical sensor, the upper hydrophilic portion is arranged at a position of the transparent member located above the sensing one of the optical sensor, the upper hydrophilic portion includes a middle portion, an end, and a downwardly inclined portion, and the downwardly inclined portion is inclined downwardly from the middle portion toward the end.

2. The transparent shield device according to claim 1, further comprising a lower hydrophilic portion arranged at a position of the transparent member located below the sensing zone of the optical sensor, wherein the lower hydrophilic portion includes a middle portion, an end, and an upwardly inclined portion, and the upwardly inclined portion is inclined upwardly from the middle portion toward the end.

3. The transparent shield device according to claim 1, wherein the outer surface of the transparent member is coated by a hydrophilic coating agent to form the upper hydrophilic portion.

4. The transparent shield device according to claim 1, wherein the transparent member is a vehicle windshield.

5. A camera device comprising:
the transparent shield device according to claim 1; and
the optical sensor that captures an image of an outer side through the transparent shield device.

6. A transparent sticker applied to the outer surface of the transparent member of the transparent shield device according to claim 1, wherein an outer surface of the transparent sticker includes at least one of the upper hydrophilic portion and the water-repellent portion.

7. A transparent shield device comprising:
a transparent member arranged in a sensing direction of an optical sensor, wherein the transparent member includes an outer surface exposed to an outer side, and the outer surface includes an enlarged sensing zone including a sensing zone of the optical sensor and a surrounding zone located at a further outer side of the enlarged sensing zone; and
at least one of a water-repellent portion, which is water-repellent and located in the enlarged sensing zone, and a lower hydrophilic portion, which is hydrophilic and located in the surrounding zone, wherein movement of a water drop on the outer surface is allowed from the sensing zone of the optical sensor to an outer side of the sensing zone of the optical sensor or restricted from the surrounding zone into the sensing zone of the optical sensor, the lower hydrophilic portion is arranged at a position of the transparent member located below the sensing zone of the optical sensor, the lower hydrophilic portion includes a middle portion, an end, and an upwardly inclined portion, and the upwardly inclined portion is inclined upwardly from the middle portion toward the end.

8. The transparent shield device according to claim 7, further comprising an upper hydrophilic portion arranged at a position of the transparent member located above the sensing zone of the optical sensor, wherein the upper hydrophilic portion includes a middle portion, an end, and a downwardly inclined portion, and the downwardly inclined portion is inclined downwardly from the middle portion toward the end.

9. The transparent shield device according to claim 7, wherein the outer surface of the transparent member is coated by a hydrophilic coating agent to form the lower hydrophilic portion.

10. The transparent shield device according to claim 7, wherein the transparent member is a vehicle windshield.

11. A camera device comprising:
the transparent shield device according to claim 7; and
the optical sensor that captures an image of an outer side through the transparent shield device.

12. A transparent sticker applied to the outer surface of the transparent member of the transparent shield device according to claim 7, wherein an outer surface of the transparent sticker includes at least one of the lower hydrophilic portion and the water-repellent portion.

13. A transparent shield device comprising:
a transparent member arranged in a sensing direction of an optical sensor, wherein the transparent member includes an outer surface exposed to an outer side, and the outer surface includes an enlarged sensing zone including a sensing zone of the optical sensor and a surrounding zone located at a further outer side of the enlarged sensing zone;
at least one of a water-repellent portion, which is water-repellent and located in the enlarged sensing zone, and a hydrophilic portion, which is hydrophilic and located in the surrounding zone; and
a second hydrophilic portion that is hydrophilic and located in the enlarged sensing zone, wherein movement of a water drop on the outer surface is allowed from the sensing zone of the optical sensor to an outer side of the sensing zone of the optical sensor or restricted from the surrounding zone into the sensing zone of the optical sensor, the water-repellent portion located in the enlarged sensing zone has an area that gradually decreases in a gravitational direction, the second hydrophilic portion is arranged adjacent to the water-repellent portion, and the second hydrophilic portion has an area that gradually increases in the gravitational direction.

14. The transparent shield device according to claim 13, wherein the outer surface of the transparent member is coated by a hydrophilic coating agent to form the hydrophilic portion.

15. The transparent shield device according to claim 13, wherein the second hydrophilic portion and the water-repellent portion are arranged in a single transparent sticker, and the transparent sticker is applied to the outer surface of the transparent member.

16. The transparent shield device according to claim 13, wherein the outer surface of the transparent member is coated by a hydrophilic coating agent to form the second hydrophilic portion.

17. The transparent shield device according to claim 13, wherein the outer surface of the transparent member is coated by a water-repellent coating agent to form the water-repellent portion.

18. The transparent shield device according to claim 13, wherein the transparent member is a vehicle windshield.

19. A camera device comprising:
the transparent shield device according to claim 13; and
the optical sensor that captures an image of an outer side through the transparent shield device.

20. A transparent sticker applied to the outer surface of the transparent member of the transparent shield device according to claim 13, wherein an outer surface of the transparent sticker includes at least one of the second hydrophilic portion and the water-repellent portion.

21. A transparent sticker applied to an outer surface of a transparent member of a transparent shield device, wherein the transparent shield device includes the transparent member arranged in a sensing direction of an optical sensor, wherein the transparent member includes the outer surface exposed to an outer side, and the outer surface includes an enlarged sensing zone including a sensing zone of the optical sensor and a surrounding zone located at a further outer side of the enlarged sensing zone, the transparent sticker comprising an outer surface, the outer surface including:
at least one of a water-repellent portion, which is water-repellent and located in the enlarged sensing zone, and a hydrophilic portion, which is hydrophilic and located in the surrounding zone; and
a second hydrophilic portion that is hydrophilic and located in the enlarged sensing zone, wherein movement of a water drop on the outer surface of the transparent sticker is allowed from the sensing zone of the optical sensor to an outer side of the sensing zone of the optical sensor or restricted from the surrounding zone into the sensing zone of the optical sensor, the water-repellent portion located in the enlarged sensing zone has an area that gradually decreases in a gravitational direction, the second hydrophilic portion is arranged adjacent to the water-repellent portion, and the second hydrophilic portion has an area that gradually increases in the gravitational direction.

22. The transparent sticker according to claim 21, wherein the transparent member is a vehicle windshield.

23. A camera device comprising:
the transparent sticker according to claim 21; and
the optical sensor that captures an image of an outer side through the transparent sticker.

* * * * *